(12) United States Patent
Wang et al.

(10) Patent No.: US 10,649,598 B2
(45) Date of Patent: May 12, 2020

(54) TOUCH ELECTRODE, DRIVING METHOD AND TOUCH PANEL

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Wentao Wang, Beijing (CN); Dawei Shi, Beijing (CN); Lu Yang, Beijing (CN); Haifeng Xu, Beijing (CN); Jie Liu, Beijing (CN)

(73) Assignees: BOE TECHNOLOGY GROUP CO., LTD., Beijing (CN); ORDOS YUANSHENG OPTOELECTRONICS CO., LTD., Ordos (CN)

( * ) Notice: Subject to any disclaimer, the term of this patent is extended or adjusted under 35 U.S.C. 154(b) by 0 days.

(21) Appl. No.: 15/972,681

(22) Filed: May 7, 2018

(65) Prior Publication Data
US 2019/0034000 A1 Jan. 31, 2019

(30) Foreign Application Priority Data
Jul. 31, 2017 (CN) .............................. 2017 0 645590

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0412* (2013.01)

(58) Field of Classification Search
CPC ....... G06F 3/044; G06F 3/0416; G06F 3/0412
See application file for complete search history.

(56) References Cited

U.S. PATENT DOCUMENTS

| | | | |
|---|---|---|---|
| 2011/0046813 A1 | 3/2011 | Yilmaz | |
| 2011/0048812 A1* | 3/2011 | Yilmaz | G06F 3/044 178/18.06 |
| 2011/0048813 A1* | 3/2011 | Yilmaz | G06F 3/044 178/18.06 |
| 2011/0062969 A1* | 3/2011 | Hargreaves | G06F 3/044 324/658 |
| 2011/0279169 A1* | 11/2011 | Salaverry | G06F 3/0416 327/517 |
| 2012/0062469 A1* | 3/2012 | Guard | G06F 3/044 345/173 |

(Continued)

FOREIGN PATENT DOCUMENTS

| CN | 101726887 A | 6/2010 |
|---|---|---|
| CN | 202351833 U | 7/2012 |

(Continued)

OTHER PUBLICATIONS

The First Chinese Office Action dated Nov. 4, 2019; Appln. No. 201710645590.7.

*Primary Examiner* — Grant Sitta

(57) ABSTRACT

A touch electrode, a driving method and a touch panel are provided. The touch electrode includes a plurality of stripe electrodes arranged in sequence at intervals, and each of the stripe electrodes includes a separation part for positioning a touch point as well as a first segment electrode and a segment separated by the separation part.

14 Claims, 2 Drawing Sheets

(56) References Cited

U.S. PATENT DOCUMENTS

| | | | | |
|---|---|---|---|---|
| 2013/0106743 A1* | 5/2013 | Xie | ............... | G06F 3/044 |
| | | | | 345/173 |
| 2016/0179259 A1* | 6/2016 | Watanabe | ............ | G06F 3/044 |
| | | | | 345/174 |
| 2018/0107330 A1 | 4/2018 | Meng | | |

FOREIGN PATENT DOCUMENTS

| | | |
|---|---|---|
| CN | 103076906 A | 5/2013 |
| CN | 104516573 A | 4/2015 |
| CN | 204331684 U | 5/2015 |
| CN | 105930012 A | 9/2016 |
| CN | 105955557 A | 9/2016 |

\* cited by examiner

TOUCH ELECTRODE, DRIVING METHOD AND TOUCH PANEL

The application claims priority to the Chinese patent application No. 201710645590.7, filed Jul. 31, 2017, the entire disclosure of which is incorporated herein by reference as part of the present application.

TECHNICAL FIELD

The present disclosure relates to a touch electrode, a driving method, and a touch panel.

BACKGROUND

Touch screens, also referred as touch panels, have been widely used in various electronic products and accepted by consumers. Therefore, the industry is constantly working to improve the touch screen display technology to provide consumers with a better user experience.

Among various types of touch screens, a projected capacitive touch screen is a type of commonly used touch screen, which utilizes a change in capacitance generated when a finger touches a capacitive touch panel to implement a touch function. The projected capacitive touch screen can be divided into an out-cell type and an embedded type according to the structure of the touch module thereof. The embedded type capacitive touch screens can be divided into On-Cell touch screens and In-Cell touch screens, and the In-Cell touch screens can be further divided into Hybrid In-cell (HIC) capacitive touch screens and Full In-cell (FIC) capacitive touch screens.

In the existing FIC capacitive touch screen, the touch electrode is integrated on the array substrate or the color film substrate in a block structure, and an extra touch lead is required to connect to the touch electrode. The problems, such as the short circuit between the touch lead and other signal lines, or the abnormal connection between the touch lead and the touch electrode, etc., will easily appear, and the defect can be caused during the touch lead being manufactured, which reduces the yield of the product.

SUMMARY

Some embodiments of the present disclosure provide a touch electrode, comprising a plurality of stripe electrodes arranged in sequence at intervals, wherein each of the stripe electrodes comprises a separation part configured to position a touch point, as well as a first segment electrode and a second segment electrode separated by the separation part.

In some examples, each of the strip electrodes extends in a first direction, the plurality of the strip electrodes are arranged in a second direction crossing the first direction, and extending directions of the plurality of the strip electrodes are parallel to each other In some examples, the plurality of the strip electrodes comprise at least one electrode group, each of the electrode groups comprises N strip electrodes, and N is a positive integer greater than 1.

In some examples, in each of the electrode groups, positions of the separation parts of different strip electrodes are different from each other in the extending directions of the strip electrodes.

In some examples, in each of the electrode groups, in the arrangement direction of the stripe electrodes, lengths of the first segment electrodes are sequentially increased, or lengths of the second electrode segments are sequentially increased.

In some examples, in each of the electrode groups, gaps between adjacent strip electrodes are equal, and pitches between adjacent separation parts are equal.

In some examples, in each of the electrode groups, the length of i-th first segment electrode or second segment electrode counted in the arrangement direction of the stripe electrode is $$\left(i-\frac{1}{2}\right)*\frac{L}{N}-\frac{D}{2}$$

in the arrangement direction of the stripe electrodes, where i=1, 2, . . . , N, L is the length of each of the stripe electrodes, D is a width of the separation part in the extending direction of each of the strip electrodes, and D is less than or equal to 4 µm.

In some examples, 4.0 mm≤L/N≤5.0 mm.

In some examples, 4.0 mm≤N*(A+B)≤5.0 mm, A is the width of each of the strip electrodes, and A is greater than or equal to 10 µm; B is the gap between adjacent stripe electrodes, and B is less than or equal to 3 µm.

In some examples, ends of the first segment electrode and the second segment electrode which are far away from the separation part are configured to be connected to a touch processing circuit.

In some examples, a material of each of the strip electrodes comprises a transparent metal oxide.

Some embodiments of the present disclosure provide a touch panel comprising any one of the touch electrodes, wherein the touch panel comprises an active region and a peripheral region located in periphery of the active region, and the touch electrode is at least located within the active region.

In some examples, ends of the first segment electrode and the second segment electrode of each of the strip electrodes of the touch electrode which are far away from the separation part are located in the peripheral region.

In some examples, the touch panel further comprises a touch processing circuit located in the peripheral region, and the ends of the first segment electrode and the second segment electrode which are far from the separation part are connected to the touch processing circuit.

In some examples, each of the strip electrodes extends in a first direction, the plurality of the strip electrodes are arranged in a second direction crossing the first direction, and the extending directions of the plurality of the strip electrodes are parallel to each other.

In some examples, the plurality of the strip electrodes comprises at least one electrode group, each of the electrode groups comprises multiple strip electrodes; in each of the electrode groups, positions of the separation parts of different strip electrodes are different from each other in the extending directions of the strip electrodes.

Some embodiments of the present disclosure provides a method of driving a touch electrode, wherein the touch electrode comprises a plurality of stripe electrodes arranged in sequence at intervals, and each of the stripe electrodes comprises a separation part for positioning a touch point, as well as a first segment electrode and a second segment electrode separated by the separation part, a position of each of the strip electrodes in an arrangement direction of the plurality of the strip electrodes is defined as a first coordinate, and a position of the separation part in an extending direction of each of the strip electrodes is defined as a second coordinate, the method comprises: scanning all of the strip electrodes; determining all of the first segment electrodes and the second segment electrodes that output the touch sense signal; determining a first set of coordinates of the first segment electrodes and the corresponding separation part, and a second set of coordinates of the second segment electrodes and the corresponding separation parts; determining a position of the touch point according to the first set of coordinates and the second set of coordinates.

In some examples, determining the position of the touch point according to the first set of coordinates and the second set of coordinates, comprises: finding a same first coordinate of the first set of coordinates and the second set of coordinates; determining the second coordinate corresponding to the same first coordinate; and determining the position of the touch point as: the first coordinate, the second coordinate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE SIGNS

Figure 1:
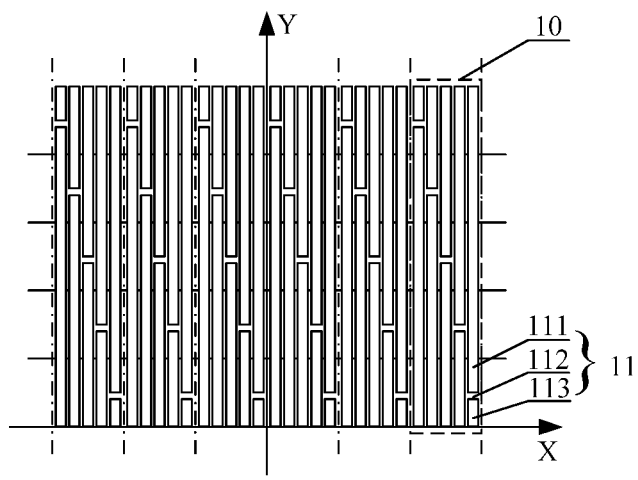
FIG. 1 is a schematic structural view of a touch electrode according to a first embodiment of the present disclosure.

10—electrode group; 11—strip electrode; 12—touch region; 111—first segment electrode; 112—separation part; 113—second segment electrode.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

An embodiment of the present disclosure provides a touch electrode comprising a plurality of stripe electrodes arranged in sequence at intervals. Each of the stripe electrodes comprises a separation part for positioning a touch point as well as a first segment electrode and a segment separated by the separation part.

The plurality of stripe electrodes form M electrode groups, each of the electrode groups comprises N stripe electrodes; in each of the electrode groups, in the arrangement direction of the stripe electrodes, lengths of the first segment electrodes are sequentially increased, or lengths of the second electrode segments are sequentially increased, and both of M and N are positive integers. However, embodiments according to the present disclosure are not limited to this, and the plurality of the strip electrodes can comprise at least one electrode group.

In each of the electrode groups, gaps between adjacent strip electrodes are equal, and pitches between separation parts of adjacent strip electrodes are equal.

In each of the electrode groups, a length of the i-th (counted along the arrangement direction of the strip electrodes) first segment electrode (or second segment electrode) is $$\left(i-\frac{1}{2}\right)*\frac{L}{N}-\frac{D}{2},$$

where i=1, 2, . . . , N, L is a length of the stripe electrodes, and D is a width of the separation part in an extending direction of the strip electrodes.

For example, 4.0 mm≤L/N≤5.0 mm.

For example, 4.0 mm≤N*(A+B)≤5.0 mm, wherein A is the width of the stripe electrode, and B is the gap between adjacent stripe electrodes.

Ends of the first segment electrode and the second segment electrode which are far away from the separation part are connected to a touch processing circuit.

The gap B between the adjacent strip electrodes is less than or equal to 3 μm, the width D of the separation part in the extending direction of the strip electrode is less than or equal to 4 μm, and the width A of the strip electrodes is greater than or equal to 10 μm.

An embodiment of the present disclosure provides a touch electrode. The touch electrode is configured to a plurality of strip electrodes arranged in sequence at intervals, and each of the strip electrodes is divided into a first segment electrode and a second segment electrode by a separation part. No additional touch lead is required to introduce electrical signals, which solves problems such as the short circuit between the touch lead and other signal lines, or the abnormal connection between the touch lead and the touch electrode, etc., and meanwhile the yield of the product is improved.

The technical solutions of the embodiments of the present disclosure will be described in detail below by exemplary embodiments.

FIG. 1 is a schematic structural diagram of a touch electrode provided by some embodiments of the present disclosure. As can be seen from FIG. 1, the touch electrode comprises a plurality of stripe electrodes 11 arranged in sequence at intervals, and each of the stripe electrodes 11 comprise a first segment electrode 111 and a second segment electrode 113 separated by a separation part 112, and a separation part 112 is configured to position a touch point.

The plurality of strip electrodes 11 can form M electrode groups 10 in an arrangement direction of the strip electrodes, and each of the electrode groups comprises N strip electrodes, where both of M and N are positive integers, and the specific values of M and N can be determined according to actual requirements.

Figure 2:
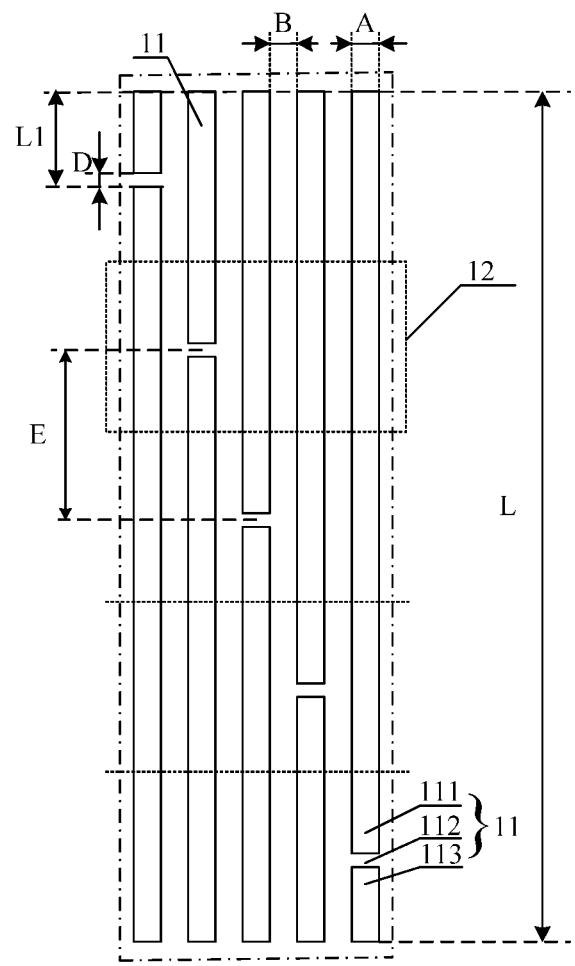
FIG. 2 is a schematic structural view of an electrode group of a touch electrode according to an embodiment of the present disclosure.
Figure 3:
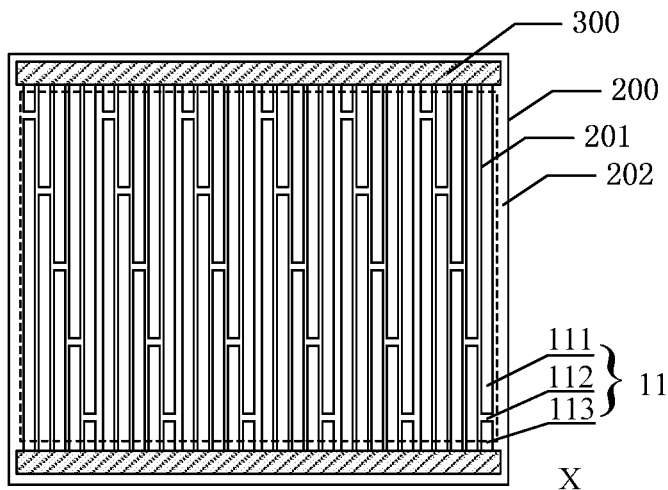
FIG. 3 is a schematic structural diagram of a touch panel according to an embodiment of the present disclosure.

As illustrated in FIG. 1, the touch electrodes form six electrode groups 10, and each of the electrode groups 10 comprise five strip electrodes 11 arranged at equal intervals. However, the embodiments of the present disclosure are not limited to this, and the number of electrode groups of the touch electrodes and the number of strip electrodes in each of the electrode groups can be any other suitable number. FIG. 2 illustrates an exemplified structure of the electrode group 10 in more detail. In the electrode group 10, each of the strip electrodes 11 comprises a separation part 112 for positioning a touch point as well as a first segment electrode 111 and a second segment electrode 113 separated by the separation part 112. The gaps B between adjacent strip electrodes 11 are equal, and the pitches E between adjacent separation parts 112 are equal. In each of the electrode groups, in the arrangement direction of the stripe electrodes 11, in the left-to-right direction of FIG. 2, the lengths of the first segment electrodes 111 are sequentially increased, or the lengths of the second segment electrodes 113 are sequentially decreased. For example, in each of the electrode groups 10, the length of the i-th first segment electrode, $$L1 = \left(i - \frac{1}{2}\right) * \frac{L}{N} - \frac{D}{2}$$

where i=1, 2, ..., N, L is the length of the stripe electrode, and D is the width of the separation part in the extending direction of the stripe electrode.

In some examples, each of the strip electrodes extends in a first direction, the plurality of the strip electrodes are arranged in a second direction crossing the first direction, and the extending directions of the plurality of the strip electrodes are parallel to each other.

For example, in each of the electrode groups, positions of the separation parts of different strip electrodes are different from each other in the extending direction of the strip electrodes.

From the above description, the embodiment of the present disclosure can be understood that, the electrode group is divided into N touch regions 12 in the extending direction of the stripe electrode 11, and in each of the touch regions 12, the separation part is provided and only one separation part 112 is provided. In order to make the size of the touch region 12 correspond to the size of the actual finger touch, for example, 4.0 mm≤L/N≤5.0 mm. Further, 4.0 mm≤N*(A+B)≤5.0 mm may be designed, where A is the width of the stripe electrodes and B is the gap between adjacent stripe electrodes, that is, the size of the touch region 12 is in a range of 4 mm*4 mm to 5 mm*5 mm. For example, the gap B between adjacent stripe electrodes is less than or equal to 3 µm, the width D of the separation part 112 in the extending direction of the stripe electrode is less than or equal to 4 µm, and the width A of the stripe electrode is greater than or equal to 10 µm. In this way, when the finger touches the touch region, only one separation part is touched, so that a specific touch position can be determined according to the separation part. In practical implementation, the width A of the stripe electrode is independent of the resolution and size of the display panel, and is only related to the size of the touch region. The smaller the touch region is the narrower the width A of the stripe electrode is.

For example, a material of each of the strip electrodes comprises a transparent metal oxide. For example, each of the strip electrodes is formed of ITO.

The operating principle of the touch electrode according to the embodiment of the present disclosure will be described below.

In order to explain the operating principle of the touch electrode in more detail, as illustrated in FIG. 1, a two-dimensional coordinate X and Y can be established in a plane where the touch electrode is located. In this way, each of the strip electrodes has a unique corresponding first coordinate Xi, the separation part of each of the strip electrodes has a corresponding second coordinate Yi, and each second coordinate Yi has a corresponding first coordinate Xi. Therefore, the strip electrodes and the separation parts of the strip electrodes constitute the coordinates (Xi, Yi). A system stores in advance the first coordinates of the strip electrodes (the first segment electrodes, and the second segment electrodes) and the second coordinates of the corresponding separation parts.

In actual practice, the ends of the first segment electrode and the second segment electrode which are far away from the separation part are connected to the touch processing circuit. The system scans the output signals of all of the first segment electrodes and the second segment electrodes. When the touch electrode is not touched, all of the first segment electrode and the second segment electrode output a first signal. When the touch electrode is touched, the touched first segment electrode or second segment electrode outputs a second signal different from the first signal. After the system scans a plurality of the first segment electrodes and the second segment electrodes that output the second signal, these first segment electrodes and second segment electrodes are determined firstly and then corresponding coordinates of the first segment electrodes and the second segment electrodes are determined, the coordinates of the plurality of the first segment electrodes and the separation parts of the plurality of the touch electrodes constitute a first set of coordinates, and the coordinates of the plurality of the second segment electrodes and the separation parts of the plurality of the second segment electrodes constitute a second set of coordinates. Then, the first set of coordinates and the second set of coordinates are determined and compared. When a certain coordinate in the first set of coordinates is the same as a certain coordinate in the second set of coordinates, it means that the first segment electrode and the second segment electrode belonging to a same strip electrode are touched at the same time, that is, the separation part as well as the first segment electrode and the second segment electrode located on both sides of the separation part are touched at the same time. Because the first segment electrode and the second segment electrode which are touched at the same time have a first coordinate, a corresponding second coordinate can be found according to the first coordinate, and thus the coordinate (X, Y) of the touch point position can be determined as: X=the first coordinate, Y=the second coordinate.

The above description is merely to describe an exemplary implementation of the present embodiment, that is, the separation part is located at an intermediate position in the corresponding touch region in the extending direction of the stripe electrode. However, the position of each of the strip electrodes in the corresponding touch region can be designed according to actual requirements. Provided that one and only one separation part is provided in each of the touch regions, the embodiments of the present disclosure can be implemented. As illustrated in FIG. 2, although the illustrated separation parts are rectangular, the shape of the separation parts is not limited herein, and the specific shape of the separation parts can be determined according to actual requirements.

In the touch electrode provided in the embodiment of the present disclosure, the position of the touch point is determined by the position of the separation part in the strip electrode, and the strip electrode is directly connected to the touch processing circuit. Therefore, no additional touch lead is required to be provided, which not only solves the problems such as the short circuit between the touch lead and other signal lines or the abnormal connection between the touch lead and the touch electrode, etc. and but also simplifies the manufacture process.

Based on the technical ideas of the embodiments described above with reference to FIG. 1, the embodiment of the present disclosure also provides a touch panel comprising the touch electrodes of the above mentioned embodiments. The touch panel can be an On-Cell touch panel or can also be an In-Cell touch panel.

For example, as illustrated in FIG. 2, the touch panel 200 comprises an active region 201 and a peripheral region 202 located around the active region 201. The touch electrode is at least located within the active region.

In some examples, as shown in FIG. 2, the ends of the first segment electrode and the second segment electrode of each strip electrode of the touch electrode which are far away from the separation part are located in the peripheral region 202.

In some examples, as illustrated in FIG. 2, the touch panel 200 further comprises a touch processing circuit 300 located in the peripheral region 202. The ends of the first segment electrode and the second segment electrode which are far from the separation part are connected to the touch processing circuit 300.

The fully-embedded FIC touch panel is illustrated as an example, and the touch panel of this embodiment comprises an array substrate and a touch electrode provided on the array substrate. The touch electrode comprises a plurality of strip electrodes arranged in sequence at intervals, and each of the strip electrodes comprises a separation part for positioning a touch point as well as a first segment electrode and a second segment electrode separated by the separation part. In an embodiment, the touch electrode can be configured as a common electrode and form a liquid crystal capacitor with a pixel electrode to control the deflection of the liquid crystal. Because the stripe electrodes have gaps and separation parts, in order to reduce the influence of the gaps and the separation parts on the display effect, in this embodiment, the gap between adjacent stripe electrodes is arranged above a data line of the array substrate, and the separation part is arranged above a gate line of the array substrate. That is, an orthogonal projection of the gap between the strip electrodes on the array substrate falls within an orthographic projection of the data line on the array substrate, i.e. a width of the orthographic projection of the gap on the array substrate is less than or equal to a width of the orthographic projection of the data line on the array substrate. An orthographic projection of the strip electrode on the array substrate falls within the orthographic projection of the gate line on the array substrate, i.e. a width of the orthogonal projection of the strip electrode on the array substrate is less than or equal to a width of the orthographic projection of the gate line on the array substrate. In this way, the gap and the separation part will not affect the display effect. For example, the width of the stripe electrode 11 can be a width of one pixel, or can be a width of a plurality of pixels, so as to ensure that the liquid crystals in the pixel region can operate normally.

Based on the technical ideas of the above mentioned embodiments, the embodiment of the present disclosure further provides a method of driving a touch electrode. The touch electrode comprises a plurality of stripe electrodes arranged in sequence at intervals, and each of the stripe electrodes comprises a separation part for positioning a touch point as well as a first segment electrode and a second segment electrode segmented by the separation part.

For example, each of the first segment electrode and the second segment electrode has a determined first coordinate, a separation part of each of the strip electrodes has a determined second coordinate, each second coordinate corresponds to one first coordinate, and the ends of the first segment electrode and the second segment electrode which are far away from the separation part are connected to the touch processing circuit. In this way, when a touch sense signal is generated by both of the first segment electrode and the second segment electrode belonging to a same strip electrode, it indicates that a touch body (for example, a finger) touches a position corresponding to the first segment electrode and the second segment of this strip electrode at the same time, that is, the position of the separation part of the strip electrode is touched. The two-dimensional coordinate of the touch position, i.e. the touch position, is determined based on the coordinate of the stripe electrodes in the arrangement direction and the coordinate of the separation part in the extending direction of the stripe electrodes. For example, when a touch body (e.g. a finger) touches a position corresponding to the first segment electrode and the second segment electrode, the touch body can generate a coupling capacitance with the first segment electrode and the second segment electrode, thereby generating a touch sense signal.

In some examples, the position of each of the strip electrodes in the arrangement direction of the plurality of the strip electrodes is defined as the first coordinate, and the position of the separation part of each of the strip electrodes in the extending direction is defined as the second coordinate. The first coordinate and the second coordinate herein are one-dimensional coordinates, and the touch position determined by using the first coordinate and the second coordinate is a two-dimensional coordinate, so that the position on the touch action on the two-dimensional touch panel can be determined.

Figure 4:
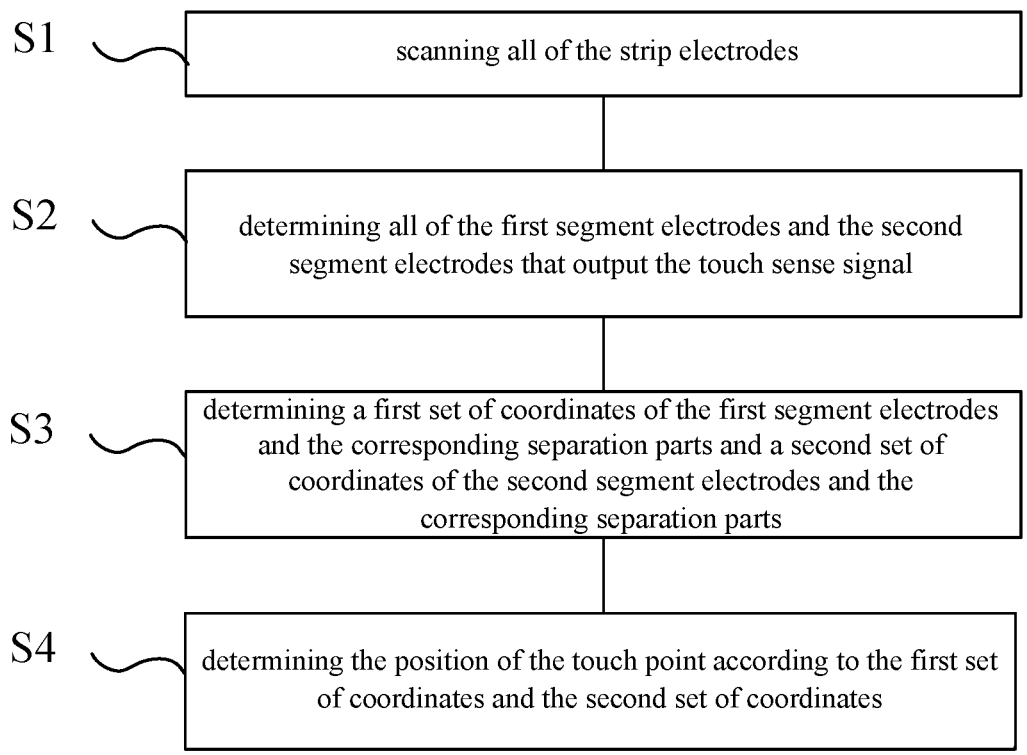
FIG. 4 is a flowchart of a method for driving a touch electrode according to an embodiment of the present disclosure.

FIG. 4 is a flowchart of a driving method according to an embodiment of the present disclosure. The driving method comprises: S1: scanning all of the strip electrodes; S2: determining all of the first segment electrodes and the second segment electrodes that output the touch sense signal; S3: determining a first set of coordinates of the first segment electrodes and the corresponding separation part, and a second set of coordinates of the second segment electrodes and the corresponding separation parts; S4: determining a position of the touch point according to the first set of coordinates and the second set of coordinates.

In the above steps, the step S4 can comprise: deciding a same first coordinate of the first set of coordinates and the second set of coordinates; determining a second coordinate corresponding to the same first coordinate; determining the position of the touch point is: the first coordinate, the second coordinate.

In the description of the embodiments of the present disclosure, it should be understood that, an orientation or positional relationship indicated by terms "middle", "upper", "lower", "front", "back", "vertical", "horizontal", "top", "bottom", "inner", "outer" and the like are based on the orientation or positional relationship shown in the drawings, in order to just facilitate to describe the present disclosure and simplify the description, but not to indicate or imply that the designated apparatus or component must have a specific orientation, and is constructed and operated in the specific orientation, and thus it should not be construed as limiting the present disclosure.

In the description of the embodiments of the present disclosure, it should be noted that, terms "install", "connect", and "connecting" should be interpreted broadly unless specifically defined or limited otherwise. For example, they can be fixed connections, or can be detachable connections, or integral connections; can be mechanical or electrical connections; can be direct connections, or can be indirect connections by the intermediary, and can be the internal communication between the two components. For those skilled in the art, the specific meanings of the above terms in the present disclosure can be understood in specific circumstances.

What are described above is related to the illustrative embodiments of the disclosure only and not limitative to the scope of the disclosure; the scopes of the disclosure are defined by the accompanying claims.

The invention claimed is:

1. A touch electrode, comprising a plurality of stripe electrodes arranged in sequence at intervals, wherein each of the stripe electrodes comprises a separation part configured to position a touch point as well as a first segment electrode and a second segment electrode separated by the separation part, wherein each of the strip electrodes extends in a first direction, the plurality of the strip electrodes are arranged in a second direction crossing the first direction, and extending directions of the plurality of the strip electrodes are parallel to each other, the plurality of the strip electrodes comprise at least one electrode group, each of the electrode groups comprises N strip electrodes, and N is a positive integer greater than 1, in each of the electrode groups, in the arrangement direction of the stripe electrodes, lengths of the first segment electrodes are sequentially increased, in each of the electrode groups, the length of i-th first segment electrode or second segment electrode counted in the arrangement direction of the stripe electrodes is $$\left(i - \frac{1}{2}\right) * \frac{L}{N} - \frac{D}{2},$$

where i=1, 2, . . . , N, L is the length of each of the stripe electrodes, D is a width of the separation part in the extending direction of each of the strip electrodes, and D is less than or equal to 4 μm.

2. The touch electrode according to claim 1, wherein in each of the electrode groups, positions of the separation parts of different strip electrodes are different from each other in the extending directions of the strip electrodes.

3. The touch electrode according to claim 1, wherein in each of the electrode groups, gaps between adjacent strip electrodes are equal, and pitches between adjacent separation parts are equal.

4. The touch electrode according to claim 1, wherein 4.0 mm≤L/N≤5.0 mm.

5. The touch electrode according to claim 1, wherein 4.0 mm≤N*(A+B)≤5.0 mm, A is the width of each of the strip electrodes, and A is greater than or equal to 10 μm; B is the gap between adjacent stripe electrodes, and B is less than or equal to 3 μm.

6. The touch electrode according to claim 1, wherein ends of the first segment electrode and the second segment electrode which are far away from the separation part are configured to be connected to a touch processing circuit.

7. The touch electrode according to claim 1, wherein a material of each of the strip electrodes comprises a transparent metal oxide.

8. A touch panel comprising the touch electrode according to claim 1, wherein the touch panel comprises an active region and a peripheral region located in periphery of the active region, and the touch electrode is at least located within the active region.

9. The touch panel according to claim 8, wherein ends of the first segment electrode and the second segment electrode of each of the strip electrodes which are far away from the separation part are located in the peripheral region.

10. The touch panel according to claim 9, further comprising a touch processing circuit located in the peripheral region, wherein the ends of the first segment electrode and the second segment electrode which are far from the separation part are connected to the touch processing circuit.

11. The touch panel according to claim 8, wherein each of the strip electrodes extends in a first direction, the plurality of the strip electrodes are arranged in a second direction crossing the first direction, and the extending directions of the plurality of the strip electrodes are parallel to each other.

12. The touch panel according to claim 11, wherein the plurality of the strip electrodes comprise at least one electrode group, each of the electrode groups comprises multiple strip electrodes; in each of the electrode groups, positions of the separation parts of different strip electrodes are different from each other in the extending directions of the strip electrodes.

13. A method of driving a touch electrode, wherein the touch electrode comprises a plurality of stripe electrodes arranged in sequence at intervals, and each of the stripe electrodes comprises a separation part for positioning a touch point as well as a first segment electrode and a second segment electrode separated by the separation part, wherein each of the strip electrodes extends in a first direction, the plurality of the strip electrodes are arranged in a second direction crossing the first direction, and extending directions of the plurality of the strip electrodes are parallel to each other, the plurality of the strip electrodes comprise at least one electrode group, each of the electrode groups comprises N strip electrodes, and N is a positive integer greater than 1, in each of the electrode groups, in the arrangement direction of the stripe electrodes, lengths of the first segment electrodes are sequentially increased, in each of the electrode groups, the length of i-th first segment electrode or second segment electrode counted in the arrangement direction of the stripe electrodes is $$\left(i - \frac{1}{2}\right) * \frac{L}{N} - \frac{D}{2},$$

where i=1, 2, . . . , N, L is the length of each of the stripe electrodes, D is a width of the separation part in the extending direction of each of the strip electrodes, and D is less than or equal to 4 μm, a position of each of the strip electrodes in an arrangement direction of the plurality of the strip electrodes is defined as a first coordinate, and a position of the separation part in an extending direction of each of the strip electrodes is defined as a second coordinate, the method comprises:

scanning all of the strip electrodes;
determining all of the first segment electrodes and the second segment electrodes that output a touch sense signal;
determining a first set of coordinates of the first segment electrodes and the corresponding separation parts, and a second set of coordinates of the second segment electrodes and the corresponding separation parts;

determining a position of the touch point according to the first set of coordinates and the second set of coordinates.

14. The method of driving the touch electrode according to claim 13, wherein determining the position of the touch point according to the first set of coordinates and the second set of coordinates, comprises:

finding a same first coordinate of the first set of coordinates and the second set of coordinates;

determining the second coordinate corresponding to the same first coordinate; and determining the position of the touch point as: the first coordinate, the second coordinate.

* * * * *

UNITED STATES PATENT AND TRADEMARK OFFICE
CERTIFICATE OF CORRECTION

PATENT NO. : 10,649,598 B2
APPLICATION NO. : 15/972681
DATED : May 12, 2020
INVENTOR(S) : Wentao Wang et al.

Page 1 of 1

It is certified that error appears in the above-identified patent and that said Letters Patent is hereby corrected as shown below:

On the Title Page

Item (30) Foreign Application Priority Data:
Jul. 31, 2017 (CN)...................... 2017 0 645590

Is changed to:
Jul. 31, 2017 (CN)......................201710645590.7

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*